US 6,546,036 B1

(12) United States Patent
Bragin et al.

(10) Patent No.: US 6,546,036 B1
(45) Date of Patent: Apr. 8, 2003

(54) ROOF CONFIGURATION FOR LASER DISCHARGE ELECTRODES

(75) Inventors: Igor Bragin, Gottingen (DE); Vadim Berger, Gottingen (DE)

(73) Assignee: Lambda Physik AG, Goettingen (DE)

( * ) Notice: Subject to any disclaimer, the term of this patent is extended or adjusted under 35 U.S.C. 154(b) by 303 days.

(21) Appl. No.: 09/587,996

(22) Filed: Jun. 6, 2000

Related U.S. Application Data

(60) Provisional application No. 60/138,409, filed on Jun. 8, 1999.

(51) Int. Cl.[7] .............................. H01S 3/22; H01S 3/223
(52) U.S. Cl. ........................................... 372/57; 372/57
(58) Field of Search ............................. 372/57, 58, 61, 372/34, 55, 86, 103, 102

(56) References Cited

U.S. PATENT DOCUMENTS

| 4,240,044 A | | 12/1980 | Fahlen et al. ............... 331/94.5 |
| 4,380,079 A | * | 4/1983 | Cohn et al. .................... 372/55 |
| 4,393,505 A | * | 7/1983 | Fahlen ......................... 372/57 |

(List continued on next page.)

FOREIGN PATENT DOCUMENTS

| DE | 44 01 892 A1 | 7/1996 | ......... H01S/3/9038 |
| EP | 0532751 A1 | 8/1992 | ..................... 3/38 |
| JP | 61-91982 | 5/1986 | ..................... 3/3 |
| JP | 61-116889 | 6/1986 | |
| JP | 03-009582 | 1/1991 | ..................... 3/38 |

OTHER PUBLICATIONS

Marchetti et al., "A new type of corona–discharge photo-ionization source for gas lasers," *Journal of Applied Physics* 1984; 56(11):3163–3168.

Taylor ey al. "Pre–preionization of a long optical pulse magnetic–spiker sustainer XeCl laser," *Review of Scientific Instruments* 1994; 65(12):3621–3627.

Basting, Dirk, *Industrial Excimer Lasers Fundamentals, Technology and Maintenance* 1991; 1–97.

Ernst, Gerard J., "Compact uniform field electrode profiles," *Optics Communications* Aug. 1983;47(1):47–51.

Ernst, Gerard J., "Uniform–field electrodes with minimum width," *Optics Communications* Mar. 1984;49(4):275–277.

Stappearts, E.A., "A novel analytical design method for discharge laser electrode profiles," *Applied Physics Letters* Jun. 1982;40(12):1018–1019.

Borisov et al., "Effects limiting the average power of compact puslse–periodic KrF lasers," *Quantum Electronics* May 1995;25(5):421–425.

Chang, T.Y., "Improved uniform–field electrode profiles for TEA laser and high–voltage applications," *The Review of Scientific Instruments* Apr. 1973;44(4):405–407.

Enami et al., "High spectral purity and high durability kHz KrF excimer laser with advanced RF pre–ionization discharge," *Proceedings of SPIE Optical Microlithography XI* Feb. 1998;3334:1031–1040.

*Primary Examiner*—Paul Ip
*Assistant Examiner*—Tuan Nguyen
(74) *Attorney, Agent, or Firm*—Sierra Patent Group, Ltd.; Andrew V. Smith

(57) ABSTRACT

A method and devices for preionizing the main discharge gas volume of a gas discharge laser are described. The method and devices provide a preionizing discharge to the main gas discharge volume from above or below the main gas discharge volume. In combination with a shielding arrangement which reduces the spread of the preionization discharge other than to the main gas discharge volume, the exposure of other laser components and gas volumes to said preionization discharge is thereby minimized.

36 Claims, 10 Drawing Sheets

U.S. PATENT DOCUMENTS

| | | |
|---|---|---|
| 4,719,637 A | 1/1988 | Cavaioli et al. .............. 372/59 |
| 4,891,818 A | 1/1990 | Levatter ...................... 372/57 |
| 4,953,174 A | 8/1990 | Eldridge et al. .............. 372/87 |
| 4,979,181 A * | 12/1990 | Nakanose et al. .......... 372/103 |
| 5,187,716 A * | 2/1993 | Haruta et al. ................. 372/55 |
| 5,247,531 A * | 9/1993 | Muller-Horsche ............ 372/86 |
| 5,247,534 A | 9/1993 | Muller-Horsche ............ 372/58 |
| 5,247,535 A * | 9/1993 | Muller-Horsche et al. .... 372/34 |
| 5,337,330 A | 8/1994 | Larson ........................ 372/86 |
| 5,535,233 A | 7/1996 | Mizoguchi et al. ........... 372/87 |
| 5,586,134 A | 12/1996 | Das et al. ..................... 372/38 |
| 5,771,258 A | 6/1998 | Morton et al. ................ 372/57 |
| 5,923,693 A | 7/1999 | Ohmi et al. ................... 372/57 |
| 6,018,537 A * | 1/2000 | Hofmann et al. ........... 372/102 |

\* cited by examiner

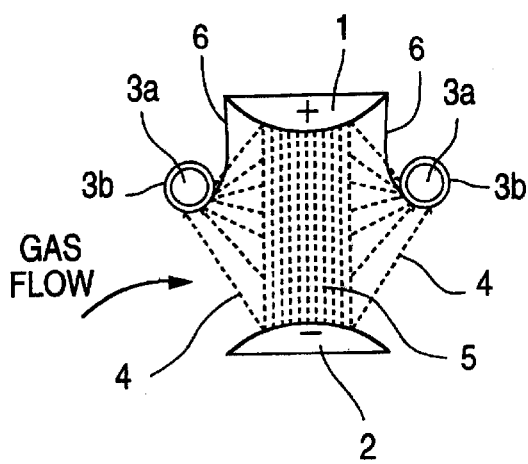
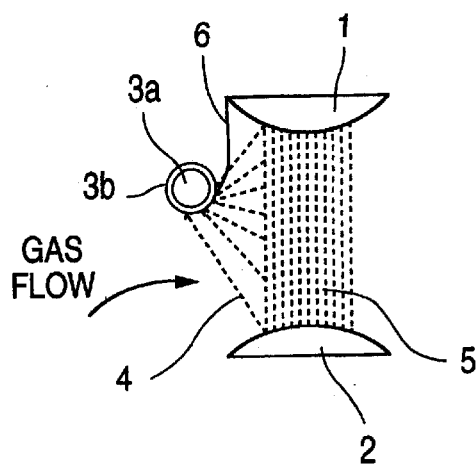
FIG. 1a
(PRIOR ART)
FIG. 1b
(PRIOR ART)
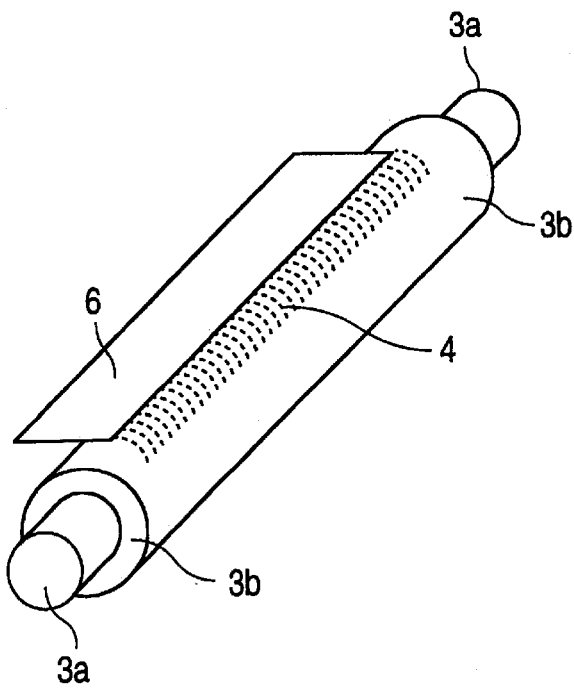
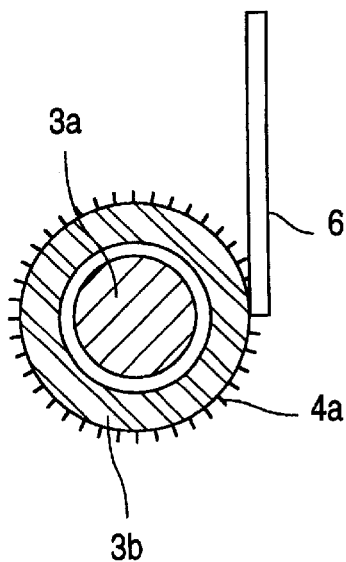
FIG. 2
(PRIOR ART)
FIG. 3
(PRIOR ART)

ROOF CONFIGURATION FOR LASER DISCHARGE ELECTRODES

RELATED APPLICATION

This application claims the priority benefit under 35 USC 119(e) of U.S. patent application Ser. No. 60/138,409 filed Jun. 8, 1999 and which is hereby incorporated by reference in its entirety.

FIELD OF THE INVENTION

The invention relates to a gas laser pumped by an electrical gas discharge, and particularly to a main electrode and corona-type preionization device configuration and technique for generating a stable pulsed gas discharge for pumping of an active medium of an excimer or molecular fluorine gas discharge laser.

BACKGROUND OF THE INVENTION

UV-preionization of a laser gas prior to a main electrical discharge in a pulsed gas laser is typically realized by means of an array of spark gaps or by another source of UV-radiation (surface, barrier or corona gas discharges), typically disposed in the vicinity of at least one of the electrodes of the main discharge electrodes of the laser. Early on in the development of excimer lasers (e.g., KrF, ArF, XeCl, XeF, etc.), conventional pulsed electrical gas discharges typically used for pumping the active media exhibited a high degree of instability. The development of discharge instabilities causes the glow discharge, a precondition for laser emission, to have a short phase (e.g., having a typical duration from 10–100 ns) and to thus be terminated more quickly than is preferred. The desired way of generating a high quality gas discharge for use in excimer and molecular fluorine lasers, is to provide an intense, yet uniform preionization of the gas volume before the main gas discharge occurs.

One way of providing this preionization is by photoionizing the laser gas with UV-light emitted from an auxiliary gas discharge before the main gas discharge is switched on. Some known methods of preionizing high pressure gas lasers include x-ray, spark and corona-gap preionization. See R. S. Taylor and K. E. Leopold, *Pre-prelonization of a Long Optical Pulse Magnetic-Spiker Sustainer XeCl Laser*, Rev. Sci. Instum. 65 (12), (December 1994) which is hereby incorporated by reference. The spark method involves the use of spark gaps (ordinary or stabilized by a dielectric surface), and the corona-gap method involves the use of pulsed corona-like discharges near a dielectric surface. Spark gap preionizers produce a periodic series of preionized volumes of laser gas along the elongated discharge area of the laser, resulting in some nonuniformity of the discharge. Thus, corona-type preionization is preferred.

Areas of focus for design improvement of corona-gap preionizers include the geometry of the dielectric body, and the arrangement of the preionization electrodes. See U.S. Pat. No. 4,718,072 to Marchetti et al. (showing a grounded internal preionization electrode surrounded by a dielectric having a positive potential applied to its outer surface through contact with the positively biased main electrode); European patent application (published) EP 0 532 751 A1 (showing an internal preionization electrode surrounded by a dielectric buried in one of the main electrodes); U.S. Pat. No. 4,953,174 to Eldridge et al. (showing the dielectric surrounding an internal preionization electrode abutting with a main discharge electrode); see also R. Marchetti et al., *A New Type of Corona-Discharge Preionization Source for Gas Lasers*, J. Appl. Phys. 56 (11), (Dec. 1, 1984); U.S. Pat. No. 4,380,079 to Cohn et al.

Reconfiguration of external electrical circuits is another area where corona-gap preionizer design improvement efforts have been focused. See Taylor et al., citation above; U.S. Pat. No. 5,247,531 to Muller-Horsche (showing an excitation of preionization electrodes affected by the same high voltage source as the main discharge electrodes including a time delay inductance between them), U.S. Pat. No. 5,247,534 to Muller-Horsche (including flow bodies configured to facilitate laser gas flow and formed of material exhibiting secondary x-ray emission characteristics) and U.S. Pat. No. 5,247,535 to Muller-Horsche (disclosing electron emission from a heated cathode, wherein x-rays emitted as the electrons impinge upon a separate anode serve to preionize the laser gas volume).

U.S. Pat. No. 5,337,330 to Larson, hereinafter referred to as the '330 patent, describes the conventional corona-like preionization arrangement generally shown in FIG. 1a. See also U.S. Pat. No. 5,247,391 to Gormley, and U.S. Pat. No. 4,953,174 to Eldridge et al. A discharge chamber having the preionization arrangement of FIG. 1a includes a high voltage main electrode (1) and a grounded main electrode (2). Each preionization unit includes one internal preionization electrode (3a) located on one side of main discharge region (5) between the main discharge electrodes (1,2). Each preionization unit includes a dielectric tube (3b) of generally cylindrical shape surrounding the internal preionization electrode (3a). A preionization discharge (ultraviolet emission) (4) from the preionization electrodes (3a & 6) and dielectric tubes (3b) causes a preionization of the volume of the main gas discharge. A pair of external preionization electrodes (6) of the preionization units comprise metal plates and are each directly connected to the nearby main discharge electrode (1) (e.g., the cathode at high potential). FIG. 1b shows a conventional preionization unit setup wherein only one internal corona-discharge preionization electrode (3a) is employed. See U.S. Pat. No. 4,240,044 to Fahlen et al.

In the case of the preionization unit of either of FIGS. 1a or 1b, energy stored in the dielectric tubes (3b) during a preionization phase, will also be absorbed into the main discharge (5). However, that added energy typically will not increase the laser output due to a high wave impedance of the dielectric tubes (3b). The tubes (3b) act much like a charged transmission line in that this wave impedance is typically much higher than the impedance of the main gas discharge. The high wave impedance is caused by a distributed inductivity of each whole dielectric tube (3b) (as a transmission line) and a concentrated inductivity at the point of electrical connection of the tubes (3b) with the internal corona discharge electrodes (3a).

The residual energy produces high voltage electrical oscillations between the capacitance of the dielectric tubes (3b) of the preionization units and the main gas discharge volume. These high voltage oscillations are undesirable because they significantly reduce the ability of the dielectric tubes (3b) of the preionization unit to resist direct high voltage breakdown and over-flashing near the open ends of the dielectric tubes (3b). Moreover, these oscillations deteriorate the quality of the main gas discharge (5) and thus hinder the operation of the laser, particularly during operation at a high repetition rate. Furthermore, the oscillations cause additional wear to the main gas discharge electrodes (1,2) and the internal corona discharge electrodes (3a), and also cause contamination and a reduced lifetime of the laser system.

The '330 patent describes another technique for alleviating the high-voltage breakdown and over-flashing problems caused by these oscillations. That technique involves providing a preionization tube with bushings at opposite ends made from an identical material as the tube and integral with the tube. The tube with the opposed bushings is described as being machined from a single integral piece of material. U.S. Pat. No. 5,818,865 describes a furtherance of the design described in the '330 patent. The manufacturing of the tubes described in the '330 and '865 patents undesirably involves complexity and cost. Moreover, the high voltage oscillations continue to degrade the quality of the discharge and produce undesirable wear to the main gas discharge electrodes and the internal corona discharge electrodes, and also cause contamination and a reduced lifetime of the laser system, as discussed above.

Another technique is described at U.S. patent application Ser. No. 09/247,887, hereinafter referred to as the '887 application, which is assigned to the same assigned as the present application, and is hereby incorporated by reference into the present application. In the '887 application, a preionization tube is provided with a sealed end and a thick, open end to address the breakdown and over-flashing problems discussed above. In addition, the '887 application discloses to connect the internal preionization electrode as shown in to ground and/or an electrical circuit including active or passive electrical components via an electrical feedthrough to the outside of the discharge chamber. The preferred electrical circuit is disclosed in the '887 application as a resistor connected to ground and having a resistance comparable to or greater than the wave impedance of the oscillating contour of the preionization unit. The connection to ground via the resistor of the internal preionization electrode serves to dampen the strength of the oscillations.

Another technique for reducing the high-voltage breakdown and over-flashing problems in the preionization is described in U.S. patent application Ser. No. 60/1 62,845, hereinafter referred to as the '845 application, which is assigned to the same assignee as the present application, and is hereby incorporated by reference into the present application. The '845 application provides a preionization device for a gas laser which comprises an internal preionization electrode having a dielectric housing around it. The internal electrode connects to advantageous electrical circuitry. Preferably, this preionization electrode is connected to the circuitry external to the discharge chamber via a conductive feedthrough which penetrates through the housing. The circuitry prevents voltage oscillations caused by residual energy stored in the dielectric tube. The circuitry also controls the voltage of the corona preionization to prevent over-flashing and dielectric breakdown at the tube ends. The circuitry reduces the voltage across the dielectric tube of the preionization unit. A semi-transparent external electrode prevents charged particles emanating from the main discharge area from settling on the housing and causing field distortion and discharge instabilities.

FIG. 1b shows a conventional preionization unit setup wherein only one internal corona-discharge preionization electrode 3a is employed. See U.S. Pat. No. 4,240,044 to Fahlen et al. FIG. 2 shows a perspective view of a preionization unit of either of FIGS. 1a and 1b. The preionization unit includes the internal electrode (3a) and the external electrode (6). The area of most intense discharge (4) is shown at the surface of the dielectric tube (3b) nearest the external electrode (6).

Another problem with conventional corona-like preionization units is illustrated in FIG. 3. In the preionization unit of FIG. 3, an internal preionization electrode (3a) is shown surrounded by a dielectric tube (3b). An external preionization electrode (6) is shown abutting the surface of the dielectric tube (3b). The dielectric tube (3b) often exhibits an unsatisfactorily non-uniform surface discharge (4a) in this configuration. The non-uniform surface discharge leads to instabilities such as arcing from areas of higher charge density. The lack of uniformity of surface discharge also can cause an unstable "jitter" of the laser output. This jitter is a fluctuation of the interval between successive laser pulses from an evolving instability in the ignition from one laser pulse to another. This variance, or jitter, is undesirable and makes laser performance less reproducible.

Other problems are associated with conventional corona-like preionization units such as that illustrated in FIG. 4. Some of the UV-light emanating from the outer surface of the dielectric tube (3b) unit illuminates the main discharge volume (5), as is desired. However, some of the gas volume outside of the main discharge region (5) is also illuminated by the UV-light. The UV-light is preionizing a larger gas volume than is either required or desired.

A disadvantage related to this is illustrated in FIG. 4, which shows that at high repetition rate operation, arcing occurs across the gas volume between the external electrode of the preionizer (6) and the grounded main electrode (2). Arcing of this kind puts constraints on the maximum achievable repetition rate. Moreover, even before the onset of visible arcing of this kind takes place, the laser pulse energy is substantially reduced by parasitic discharges in the additionally preionized gas volume. These parasitic discharges produce an instability in the laser operation.

Moreover, as may be understood from inspection of the arrows pointing away from the tube (3b) of FIG. 4, some UV-light is undesirably misdirected away from the main discharge region (5) and is absorbed by the dielectric laser chamber walls. As a result, charges build up on the walls and further inefficient arcing and parasitic discharging occurs. To address this problem, Japanese patent application no. 3-9582 and U.S. Pat. No. 5,337,330 to Larson each disclose shielding elements, shown as reference numeral (6) in FIG. 4 and numerals (27) and (36) in FIG. 5, respectively, which reduce the probability of arcing between the dielectric pipe and other portions of the gas chamber, including the main electrodes.

The '887 patent application also discloses external electrodes which shield the dielectric tube or pipe from the second main discharge electrode. This shielding reduces or prevents the arcing such as that shown in FIG. 4 and results in superior performance. The arcing is reduced or prevented because the gas volume outside of the main discharge area and particularly near the walls of the gas discharge chamber where downstream arcing usually develops, is not preionized due to the shielding effect of the external electrode.

A design of the external electrodes of the '887 application provided an enhanced illumination of the main gas discharge volume because the external electrodes did not undesirably screen the illumination. The design of the external electrode of the '887 application also made it possible to achieve higher a repetition rate during operation without having to increase gas flow velocity between the main electrodes.

SUMMARY OF THE INVENTION

It is an object of the invention to design a preionization device for a gas discharge laser, including an excimer, molecular, or molecular fluorine laser having a high quality gas discharge, by providing an intense, yet uniform preionization gas discharge wherein the preionization gas discharge volume more closely corresponds to the main gas discharge volume.

It is an object of the invention to provide a novel configuration of the preionization device with respect to the main discharge gas volume and main discharge electrodes which improves laser performance by minimizing the gas volume outside of the main discharge gas volume area which is exposed to a preionization discharge.

It is a further object of this invention to provide for a more stable laser system with reduced degradation of gases and components stemming from the repeated excitation of unnecessarily large volumes of laser gases during laser operation.

The present invention meets all of these objects and addresses the shortcomings of conventional preionization techniques by providing a preionization device which is configured to shield a major portion of the discharge chamber gas volume from the preionization corona discharge while closely aligning the gas volume penetrated by the preionization corona discharge with the gas volume of the main discharge. Thus, a smaller volume of gas is preionized to achieve the same amount of preionization support to the main gas discharge.

The laser preionization device has an internal preionization electrode located within the laser discharge gas chamber. This internal electrode is connected to a power supply circuit which is preferably external to the discharge chamber. The internal electrode is preferably cylindrical and mostly enclosed by an insulating or dielectric sheath/ housing, preferably a ceramic tube. The U.S. patent applications Ser. Nos. 09/247,887 and 60/162,845, which are each assigned to the same assignee and are each herein incorporated by reference in their entirety, describe some of the applicable configurations and compositions of internal electrodes, dielectric housings, and external electrodes. For example, the '845 application discloses a preferable arrangement wherein circuit elements such as a capacitor and/or one or more resistive elements are connected between the internal electrode and ground to reduce the energy applied to a dielectric tube. The '845 patent application also discloses desirable dimensions (e.g., the inner and outer diameters of a dielectric tube housing) and discloses a preferred dielectric tube which is ceramic and that a preferred ceramic tube may preferably be made of polycrystalline or monocrystalline $Al_2O_3$. The '887 patent application describes suitable external electrode designs, including particularly semitransparent electrodes.

The dielectric tube and the internal electrodes preferably have a cylindrical shape with parallel axes. They also have any other suitable shape. For example, see FIG. 12.

According to the invention, the device provides a "roof" configuration of the electrodes. Without being situated between the main electrodes, the internal electrode and insulating tube combination runs parallel to the main discharge electrodes within essentially the same plane defined by the main discharge electrodes. Rather than preionizing the main gas discharge volume from one side or the other of the main discharge planar volume defined by the two main electrodes as in FIG. 4, the "roof" device therefore preionizes the main discharge gas volume from above (as shown in FIG. 7) or below (depending on the arbitrary point of reference) the main gas discharge volume.

The preionization device also has an external electrode. The '845 and '887 patent applications teach desirable configurations of an external electrode within a preionization device. The internal electrodes and the external electrodes are so named because of their positions inside and outside of the dielectric tube, respectively. Preionization involves a gas discharge near the surface of the dielectric tubes when the external power supply circuit establishes a high voltage difference between the internal and external electrodes. This gas discharge is supported by capacitive coupling between the internal electrodes and the external electrodes.

The device also provides shielding which encloses the preionization gas volume except for an elongated slit running parallel to the internal electrode and facing in the direction of a main electrode so as to release a portion of the preionization gas discharge into the main discharge gas volume. The shielding, except for the slit, otherwise prevents the preionization gas discharge from escaping the preionization device.

FIG. 6 shows a block diagram of an example excimer laser system suitable for use with this preionization device. In this system, there is a gas discharge chamber (112) containing the laser gas mixture, a fan (not shown) and cooling unit (not shown). Pressure and temperature gauges for monitoring the gas pressure and temperature within the tube may also be provided. The chamber (112) contains a pair of main electrodes, the anode (102) and cathode (101), which define between them a main discharge gas volume (105). The electrical pulse power and discharge module is connected to the main discharge electrodes.

The tube has resonator units in optic modules at each end: a rear optics module (120) and a front optics module (130). The rear optics module (120) contains a high reflective means (121). Some preferred rear high reflective means can be a mirror or reflective grating for line narrowing and additional optical elements for beam stirring or forming like mirrors or prisms. A wavelength calibration unit is preferably included with the rear optics module (120). Preferred wavelength calibration units or devices and techniques are disclosed in U.S. Pat. No. 4,905,243 and U.S. patent applications Ser. Nos. 09/136,275, 09/167,657 and 09/179,262, each of which is assigned to the same assignee as the present application and is hereby incorporated by reference.

The front optic module contains an outcoupling means (131) and optionally additional elements for beam steering and shaping the output beam (115). The front optics module (130) contains an output coupling resonator reflector (131) and optional elements, such as mirrors, beam splitters, prisms or dispersive elements (e.g., gratings, etalons) for beam steering splitting or forming. Such optical elements and techniques are described in U.S. Pat. Nos. 4,399,540, 4,905,243, 5,226,050, 5,559,816, 5,659,419, 5,663,973, 5,761,236, and 5,946,337, and U.S. patent application Ser. Nos. 09/317,695, 09/130,277, 09/244,554, 09/317,527, 09/073,070, 60/124,241, 60/140,532, 60/140,531, and 60/171,717 each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, and 4,829,536, which are each hereby incorporated by reference into the present application, as describing line narrowing, selection and/or tuning elements, devices and/or techniques.

An electrical pulse power and discharge unit (100) energizes the laser gas mixture. The pulse power and discharge unit provides energy to the laser gas mixture via a pair of main electrodes (101,102) within the discharge chamber. The energy of the output beam (115) has a known dependence on driving voltage of the pulse power module. The driving energy is adjusted during laser operation to control and stabilize the energy of the output beam. Means for regulating laser operation and conditions to control the output beam are described in U.S. patent application Ser. No. 60/130,392 and its related non-provisional U.S. patent application filed Apr. 17, 2000 (application no. not yet assigned) which are assigned to the same assignee and hereby incorporated by reference in their entirety.

The gas mixture of an excimer or molecular fluorine laser is characterized as being strongly electronegative and maintained at an elevated pressure (e.g., a few bars). The gas mixture for an excimer laser includes an active rare gas such as krypton, argon or xenon, a halogen containing species such as fluorine or hydrogen chloride, and a buffer gas such as neon or helium. A molecular fluorine laser includes molecular fluorine and a buffer gas such as neon and/or helium.

The gas mixture is naturally heated as it is excited by the electrical discharge in the discharge area. The heat exchanger (not shown) cools the heated gas after it exits the discharge area. The portion of the gas mixture which participates in a laser pulse is replaced by fresh gas before the next laser pulse occurs. A gas supply unit (111) also typically supplies fresh gas to the system from outside gas containers (118) to replenish each of the components of the gas mixture. In particular, halogen is typically supplied because the halogen concentration in the gas mixture tends to deplete during operation, while it is desired to maintain a constant or near constant halogen concentration in the gas mixture. Means for releasing some of the gas mixture is also typically provided so that the gas pressure can be controlled. The preferred gas replenishment procedures are set forth in U.S. provisional patent application Ser. No. 60/1 24,785 and U.S. provisional patent application No. 60/130,392 and its related non-provisional U.S. patent application filed Apr. 17, 2000 (application no. not yet assigned) which are each assigned to the same assignee and hereby incorporated by reference in their entirety.

BRIEF DESCRIPTION OF THE DRAWINGS

FIG. 1a shows a conventional arrangement of a discharge chamber of a high repetition rate pulsed discharge laser having two internal and external preionization electrode pairs and a UV-preionized active volume.

FIG. 1b shows the arrangement of FIG. 1a having instead only one internal and external electrode pair.

FIG. 2 shows an axial geometry of a conventional UV-preionization unit having a gas discharge stabilized by a dielectric surface.

FIG. 3 shows an arrangement of a conventional UV-preionizer in which the external electrode abuts the dielectric tube surrounding the internal electrode.

DETAILED DESCRIPTION OF PREFERRED EMBODIMENTS

In a preferred embodiment according to this invention, an elongated main electrode is configured so as to provide a cavity accommodating a preionization unit within a cavity. The preionization device generally has an elongated preionization unit, including a preionization electrode within a dielectric tube, disposed in a partly hollow main electrode of a gas discharge laser, wherein said main electrode defines an elongated slit for exposing the outer surface of said dielectric tube to a discharge area of the laser, such that UV radiation, emanating from said outer surface of said tube due to a corona discharge generated on said dielectric surface, is directed to said discharge area for ionizing laser gas species therein prior to a main discharge.

In a preferred embodiment (see FIG. 7), a main electrode serves as the shielding member. In this embodiment, the main electrode is configured to surround the ceramic tube of the ionization device while also defining a slit or opening within or between the shield members to provide a window for corona preionization of the main discharge gas volume.

In this embodiment (FIG. 7), the cathode function of a main discharge electrode of the laser functions as the external electrode of the preionization device. This embodiment of the "roof" configuration of the electrodes and preionization works as follows: The internal electrode (103a) is connected to an advantageous pulser circuit (100). Advantageous pulser circuits are described in U.S. Pat. Nos. 6,005,880 and 6,020,723; and U.S. patent application Ser. No. 09/390,146 which are each hereby incorporated by reference in their entirety. U.S. Pat. Nos. 5,729,562; 5,914,974; and 5,936,988 also describe advantageous pulser circuits and are hereby incorporated by reference in its entirety. In other embodiments the internal electrode is connected to advantageous circuitry which also prevents voltage oscillations caused by residual energy stored in the dielectric tube. The circuitry also controls the voltage of the corona preionization to prevent over-flashing and dielectric breakdown at the tube ends. Some preferred circuitry is described in U.S. patent application Ser. No. 60/162,845 which is assigned to the same assignee and hereby incorporated by reference in its entirety.

The internal electrode is surrounded by an insulating dielectric preferably a high purity alumina ceramic tube (103b), and preferably providing only sufficient room in the interior of the ceramic tube for thermal expansion of the internal electrode (103a). See the '887 application describing an internal electrode and tube with a slit to accomodate expansion.

Figure 4:
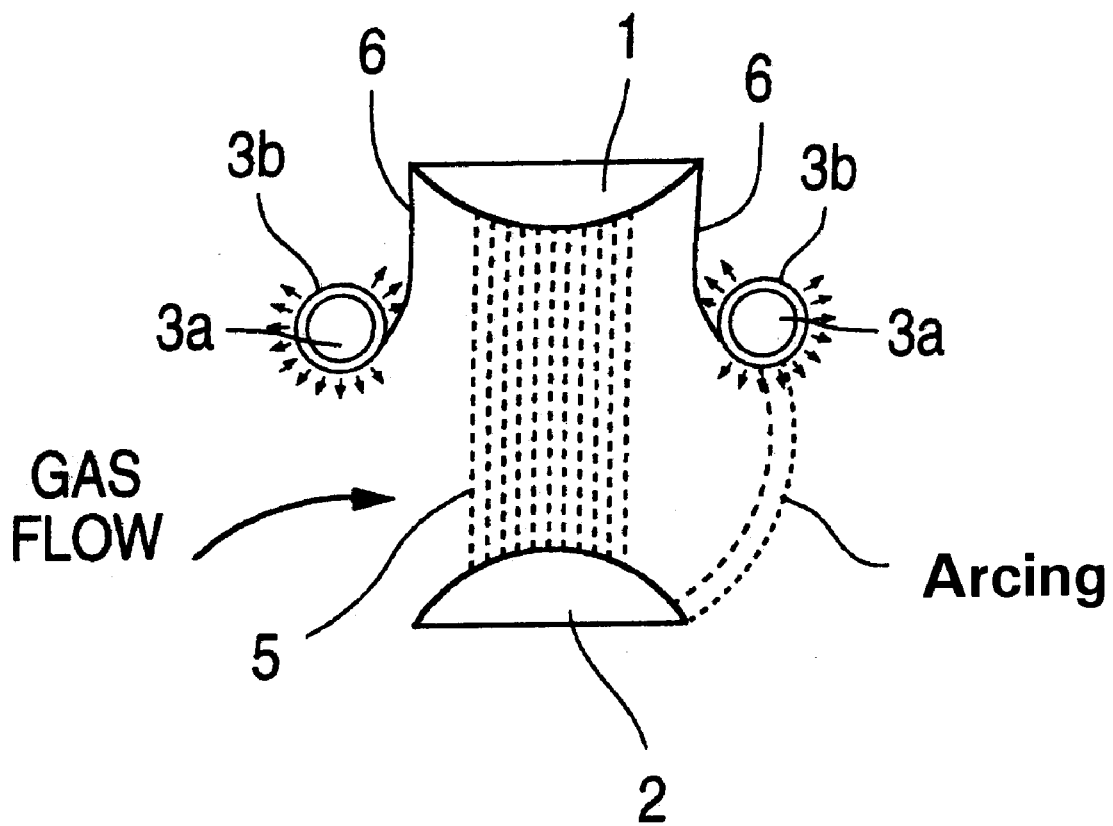
FIG. 4 shows a UV-preionizer arrangement having conventional external electrodes.
Figure 5:
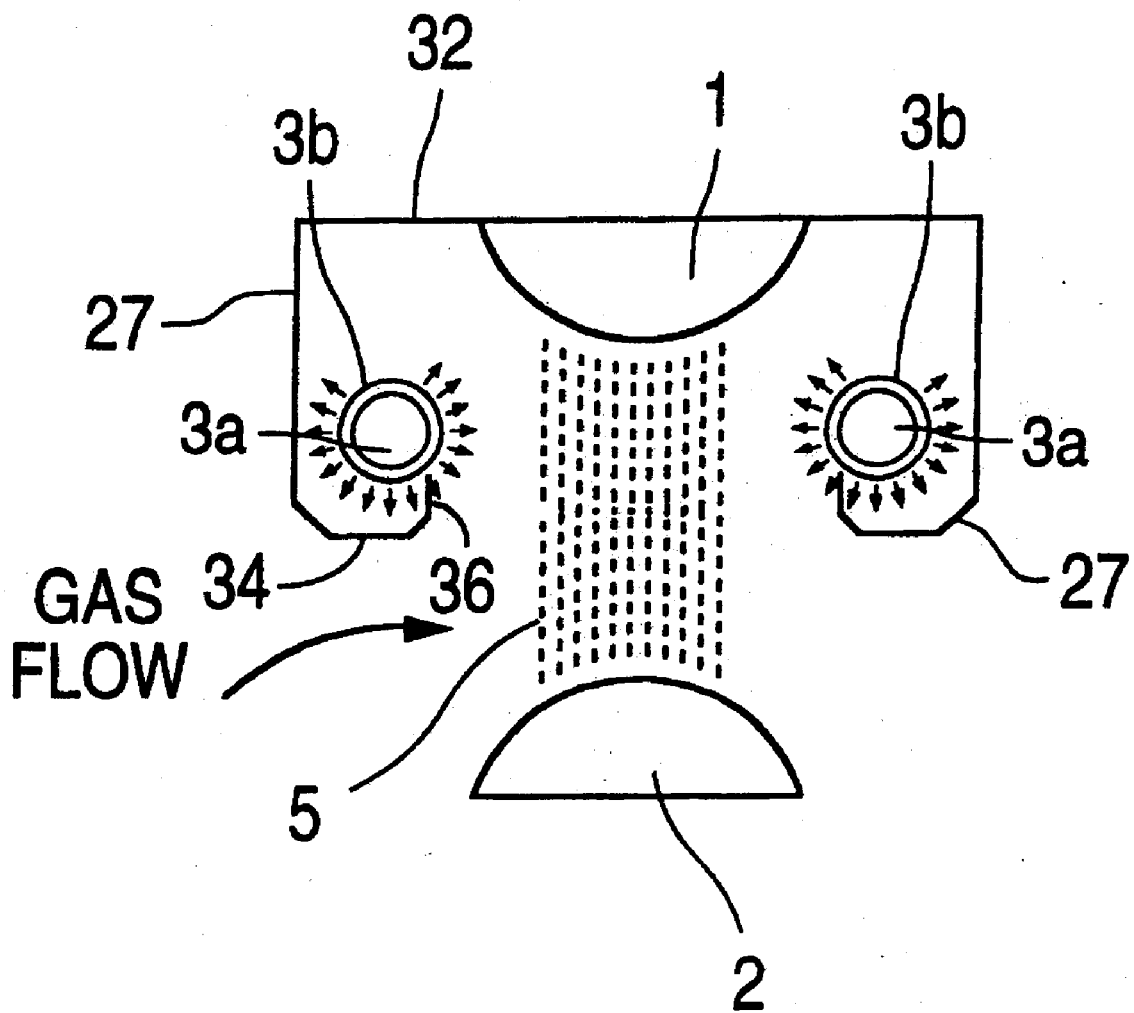
FIG. 5 shows a UV-preionizer arrangement configured with external electrode(s) placed on either side of the main discharge gas volume and configured to shield much of the gas discharge chamber volume from the preionization corona discharge.
Figure 6:
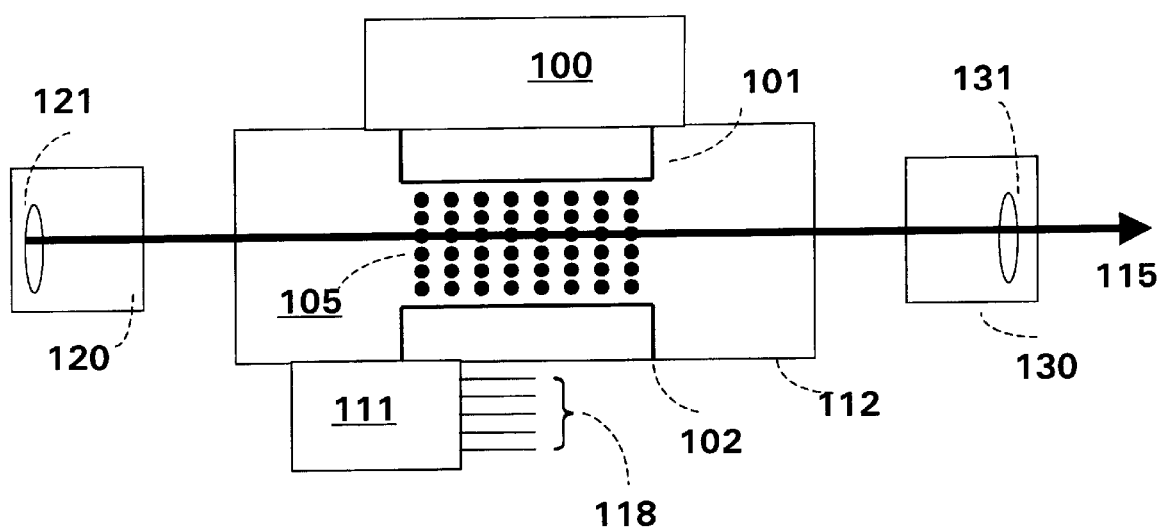
FIG. 6 shows a schematic block diagram of an excimer laser system.

Almost completely surrounding the internal electrode (103a) and ceramic tube (103b) is the cathode (101) of the main discharge electrode in this system. The cathode is configured to provide a slit/window/opening (107) through which the UV radiation of the corona discharge may pass. The opening is placed directly opposite the anode main electrode (102) such that the gas volume to be excited by the corona discharge of the preionization device closely overlaps with the discharge gas volume (105) to be excited by the discharge of the main electrodes, anode (102) and cathode (101). Thus, this configuration differs from configurations which have internal preionization electrodes to one side of the main gas discharge volume as in FIG. 5 and which energize gas volumes on either side of the main gas discharge volume.

The main electrodes when configured as part of a shielding electrode will also accomodate a variety of configurations which direct the locations on the electrode from which the main gas discharge is generated. The cathode (101) and anode (102) electrode of FIG. 7 have a shape including a prominence or ridge (106) on the surface of each which influences the shape and location of the discharge between them. Other shapes may be realized by one skilled in the art as providing adequate discharge conditions other than those shown at FIG. 7.

Figure 7:
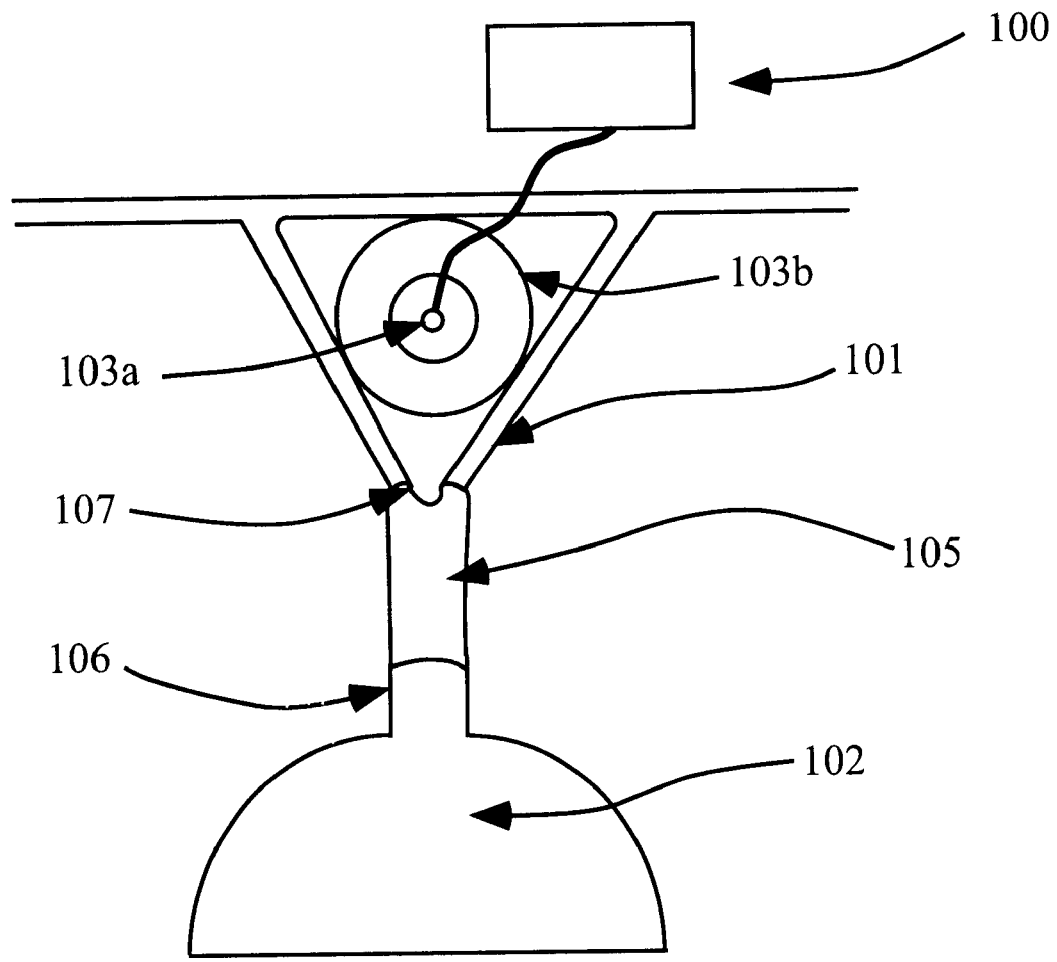
FIG. 7 shows a cross-section of a UV-corona discharge device according to the present invention.

The slit or opening may be a physical opening as in FIG. 7 at 107, or the opening may alternatively be in the form of a window comprising a semi-transparent or transparent member. In a preferred embodiment, the window comprises an electrode member which transmits a substantial portion of the UV radiation generated by the corona discharge. U.S. patent application Ser. Nos. 60/162,845 and 09/247,887, which are assigned to the same assignee and hereby incorporated by reference in their entirety, describe a semi-transparent mesh electrode that may be used with the preferred embodiment.

A benefit of the "roof" configuration of FIG. 7 is a substantial reduction in the preionization gas volume not within the main discharge volume that is excited by the preionization discharge while providing a sufficient preionization excitation of the main discharge gas volume. The reduced volume of unwanted preionization reduces the risk of arcing outside of the main gas discharge volume. Such arcing parasitizes energy from the main discharge volume and can damage laser components. At high repetition rates, the above reduced volume also reduces the risk of arcing downstream of the gas flow in the laser. Thus, higher laser repetition rates may be achieved.

A prototype lithography-type, corona preionized, laser tube was built using the "roof" preionization device according to FIG. 7. This embodiment used a ceramic tube with a 10 mm outer diameter and a 4 mm inner diameter with feedthroughs and connections as understood by those skilled in the art. The '845 patent application describes some feedthroughs and connections that may be used with the preferred embodiment. The ceramic tube was symmetrically covered by two 1 mm thick copper shields which also served as the main electrode (cathode). The anode electrode used was a normal solid electrode about 500 mm long. The gas discharge gap was preionized via a slit in the cathode electrode shield which was less than 2 mm wide. The main discharge electrodes were separated by a gap of about 15 mm.

Figure 8:
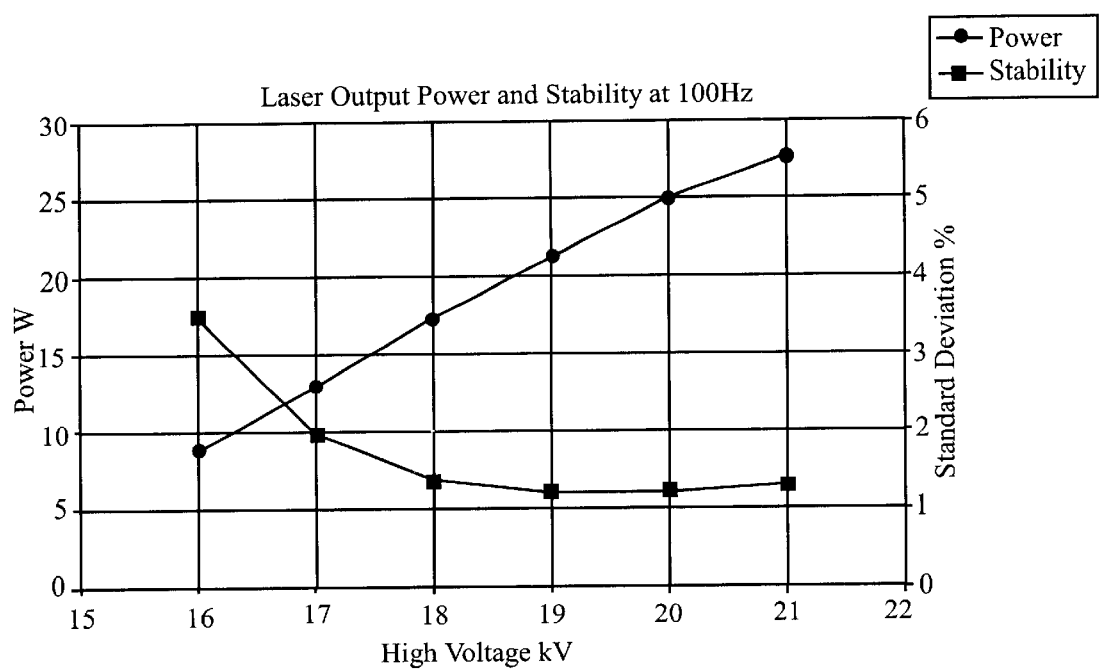
FIG. 8 is a graph relating laser output power and stability at 19 kV as a function of the laser repetition rate.
Figure 9:
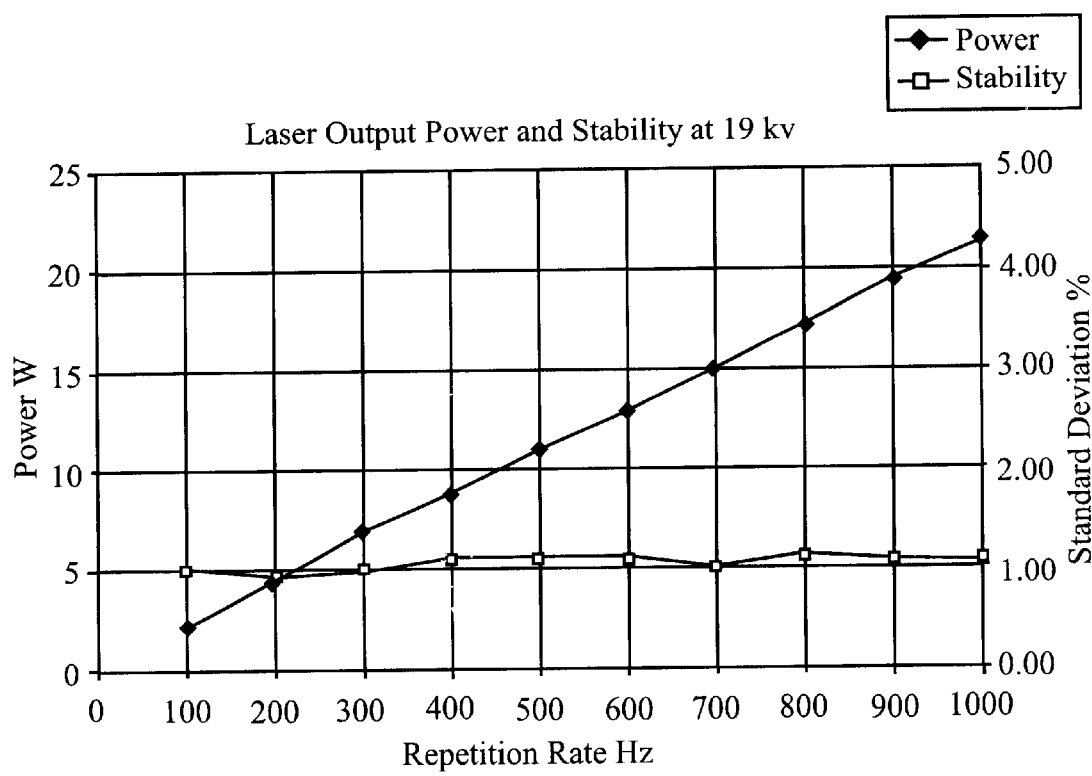
FIG. 9 is a graph relating laser output power and stability at a firing rate of 1000 Hz as a function of the operating voltage.

The performance characteristics of the above prototype are shown in FIG. 8 and FIG. 9. FIG. 8 depicts the laser output power and stability at a 1000 Hz firing rate as a function of the applied voltage. The prototype laser output power increased linearly with the applied voltage. As illustrated in FIG. 8, the prototype laser stability remained stable at just above 1% at the higher voltages tested.

FIG. 9 depicts the prototype laser's output power and stability as a function of the firing rate. This figure shows laser power increasing linearly with firing rate. FIG. 9 also shows that laser stability performance is not degraded as the firing rate increases 10-fold from 100 to 1000 Hz.

Figure 10:
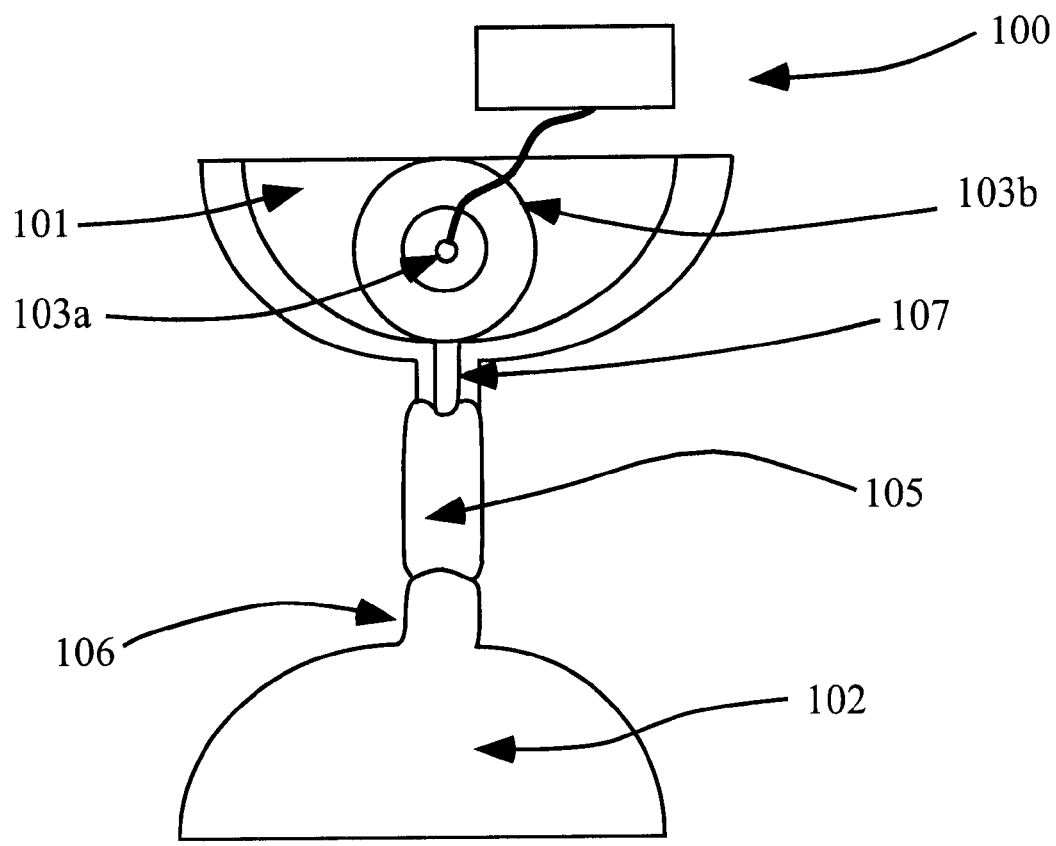
FIG. 10 shows a cross-section of an alternative embodiment of a corona discharge device according to the present invention.

Another "roof" embodiment of the invention is depicted in FIG. 10. This embodiment works similarly to the embodiment of FIG. 7 but provides a different arrangement of the main electrode to the dielectric member surrounding the internal electrode. In this embodiment, the main electrode configuration confines the corona discharge so as to shield much of the gas chamber volume. This configuration also provides an opening to allow the corona preionization discharge to excite the main gas discharge volume while exciting very little of the remainder of the gas volume external to the preionization unit. However, the configuration brings the main electrode in contact, or close to contact, with the dielectric tube near the opening to the main discharge gas volume. This configuration thereby allows for a more intense corona to be formed near the opening. This configuration also provides a better collimation of the preionization radiation.

A third embodiment is of the "roof and floor" type. In this embodiment (FIG. 11), each of the main electrodes of the discharge chamber is associated with a preionization device. In this embodiment, the main electrodes each also function as an external electrode and shield of the preionization device while providing an opening for the preionization discharge to excite the main discharge gas volume.

The "roof and floor" embodiment (see FIG. 11) works as follows: The internal electrode (103a) of the "roof" preionization device (associated with the cathode) is connected to an advantageous high voltage power supply and regulation circuit (100). The internal electrode (103a) is surrounded by a ceramic tube (103b) preferably having a high dielectric constant, such as may be made of a high purity or substantially high purity ceramic. Preferably, and in this embodiment, the ceramic tube provides only sufficient room in the interior of the ceramic tube for thermal expansion of the internal electrode.

Almost completely surrounding the internal electrode (103a) and ceramic tube (103b) is the cathode (101) of the main discharge circuit. Preionization involves a gas discharge near the surface of the dielectric tube (103b) when the external power supply circuit (100) establishes a high voltage difference between the internal (103a) and cathode (101). This gas discharge is supported by capacitive coupling between the internal electrode(s) (103a) and the cathode (101). The cathode (101) is configured to provide a slit/window/opening (107) through which only a portion of the energy of the corona discharge can pass. The opening (107) faces the anode main electrode (102) such that the gas volume to be excited by the corona discharge closely overlaps with the discharge gas volume (105) to be excited by the discharge of the main electrodes.

Figure 11:
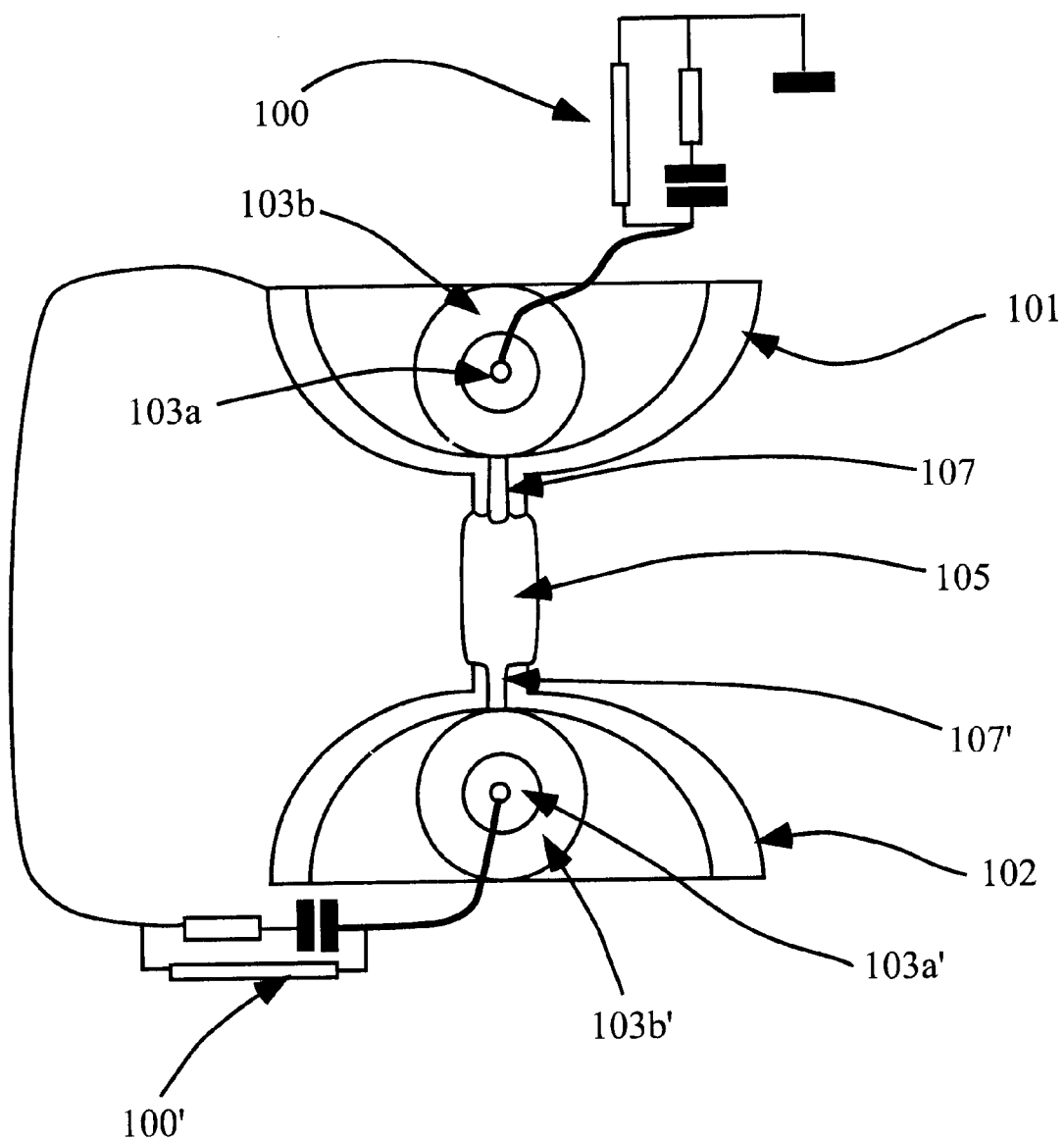
FIG. 11 shows a cross section of a discharge gas chamber of an alternative embodiment of a UV-corona discharge laser which has a first and a second preionization device according to the present invention.
Figure 12:
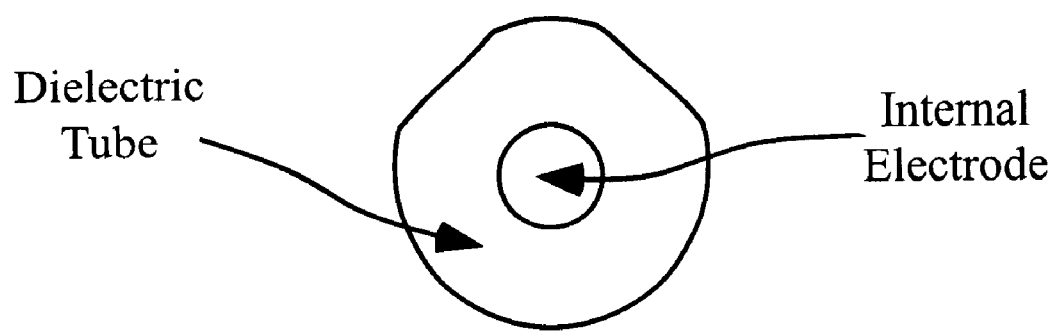
FIG. 12 shows a cross-section of a preferable dielectric tube and internal electrode.

The "floor" preionization device of the embodiment of FIG. 11 works analogously and as follows. The internal electrode (103a') of the "floor" preionization device is connected to the cathode (101). The internal electrode (103a') is surrounded by an insulating member having a very high dielectric constant, preferably a ceramic tube (103b') as above. Almost completely surrounding the internal electrode (103a') and ceramic tube (103b') is the anode electrode (102) of the main discharge circuit which functions analogously to the "roof" electrode and opens (107') to the main discharge gas volume (105). Together, the "roof" and "floor" preionization assemblies pre-ionize the main discharge gas volume (105) from opposite directions.

All of the references discussed in the Background are hereby incorporated by reference herein as setting forth many possible variations of preferred embodiments within the scope and spirit of the invention.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above.

We claim:

1. A preionization discharge device disposed within a gas discharge chamber of an excimer or molecular flourine laser having a main gas discharge volume defined between a pair of elongated main electrodes, said device comprising:
   (a) an elongated internal preionization electrode;
   (b) a dielectric member around said internal electrode; and,
   (c) one of said pair of elongated main electrodes enclosing said member and having all elongated slit interposed between said member and said main gas discharge volume; said main electrode thereby confining said preionization discharge except for a portion of said preionization discharge; said portion being released essentially within a gas volume defined by said main electrodes and including said main gas discharge volume.

2. A device according to claim 1, wherein said main electrode is a cathode.

3. A device according to claim 1, wherein said main electrode is an anode.

4. A device according to claim 1, wherein said internal electrode is connected to a power supply circuit.

5. A device according to claim 1, wherein said member comprises a tube made of ceramic material.

6. A device according to claim 1, wherein said housing comprises substantially pure polycrystalline or monocrystalline $Al_2O_3$.

7. An excimer or molecular flourine gas discharge laser having at least one preionization discharge device according to claim 1.

8. A device providing a corona-type preionization discharge for a gas discharge laser having a main gas discharge volume defined by a pair of main electrodes, said device comprising:
   a) an elongated internal preionization electrode covered by a dielectric sheath;
   b) a main electrode substantially surrounding said sheath and configured to provide an elongated opening to said main discharge gas volume; said main electrode thereby confining said preionization discharge except for a portion of said preionization discharge released through said opening directly to said main discharge gas volume.

9. A device according to claim 8, wherein said dielectric sheath comprises a ceramic tube.

10. A device according to claim 8, wherein said main electrode is a cathode.

11. A device according to claim 8, wherein said main electrode is an anode.

12. A device according to claim 8, wherein said sheath comprises monocrystalline $Al_2O_3$.

13. A device according to claim 8, wherein said sheath comprises polycrystalline $Al_2O_3$.

14. A gas discharge laser having at least one device according to claim 8.

15. A device according to claim 8, wherein said laser is an excimer or molecular fluorine type laser.

16. A device according to claim 8, wherein said elongated opening is a window comprising material substantially transparent to UV light.

17. A device according to claim 8, wherein said elongated opening is a window comprising a portion of said external electrode which is substantially transparent to UV light.

18. A method for preionizing the main gas discharge volume of a gas discharge laser while reducing the exposure of other gas volumes of said laser to a preionization discharge, said method comprising the steps:
   (a) generating a preionization discharge within an internal cavity of a main discharge electrode for ionizing a gas mixture just prior to a main discharge, radiation generated by the preionization discharge exiting from the cavity substantially through an opening in the main discharge electrode, the opening substantially facing the main gas discharge volume; and
   (b) generating the main discharge for producing a laser pulse when the gas mixture within the main gas discharge volume is sufficiently ionized due to the generation of said preionization discharge.

19. A method according to claim 18, wherein said radiation generated by the preionization discharge exits from said cavity essentially only through said opening.

20. A method according to claim 18, wherein said opening is via a window comprising a material transparent or substantially transparent to said radiation generated by the preionization discharge.

21. A method according to claim 18, wherein said opening is via an elongated slit defined by preionization radiation shielding.

22. A method according to claim 21, wherein said shielding comprises a main discharge electrode.

23. A method according to claim 18, wherein said gas laser is one of an excimer laser and a molecular fluorine laser.

24. A method according to claim 18, wherein said opening is via a window comprising a portion of said main electrode which is partially transparent to said preionization discharge.

25. A method according to claim 18, wherein said main electrode comprises a window partially transparent to UV radiation.

26. An excimer or molecular fluorine laser system, comprising:
   (a) a discharge chamber filled with a laser gas mixture;
   (b) a pair of elongated main electrodes disposed within the discharge chamber and defining a discharge area therebetween, said main electrodes being connected to an external discharge circuit for energizing the gas mixture, at least one of said main electrodes defining an elongated cavity and a slit which opens the cavity to the discharge area;
   (c) at least one elongated preionization unit disposed within said cavity; and,
   (d) an optical resonator including the discharge chamber and a pair of resonator reflector surfaces for generating a laser beam,
   wherein a discharge generated on a surface of said preionization unit which is disposed therein produces UV radiation which radiates through said slit and ionizes the laser gas within the main discharge area prior to a main discharge between said pair of main electrodes.

27. A laser system of claim 26, wherein said cavity defined within said main electrode is substantially triangular in shape.

28. A laser system of claim 26, wherein said preionization unit includes a dielectric tube and said cavity defined within said main electrode has a radius of curvature greater than said dielectric tube.

29. A laser system of claim 26, wherein said internal preionization electrode is also connected to said discharge circuit via an additional circuit which reduces the voltage applied to said internal preionization electrode relative to that applied to the other main electrode.

30. A laser system of claim 26, wherein said preionization unit includes a dielectric tube that contacts an internal surface of said main electrode at two or more places around its outer periphery.

31. A laser system of claim 26, further comprising a second preionization unit.

32. A laser system of claim 26, wherein said preionization unit includes a dielectric tube that is made of high purity alumina.

33. A laser system of claim 26, further comprising an at least semi-UV transparent screen covering said slit.

34. An elongated preionization unit, including a preionization electrode and a dielectric member, disposed in a partly hollow main electrode of a gas discharge laser, wherein said main electrode is configured to include an elongated slit for exposing a discharge surface of said dielectric member to a discharge area of the laser, such that UV radiation, emanating from said surface of said dielectric member due to a discharge generated on said discharge surface, is directed to said discharge area for ionizing laser gas species therein prior to a main discharge.

35. An excimer or molecular flourine laser comprising at least one elongated preionization unit according to claim 34.

36. A excimer or molecular fluorine laser comprising:

(a) A chamber housing a lasing gas;

(b) A resonator surrounding the chamber;

(c) A pair of elongated spaced apart main electrodes defining a discharge region therebetween, said electrodes being coupled to an energy source for exciting the lasing gas and creating a laser output, at least one of said main electrodes having an internal cavity and an opening facing the other electrode and providing communication between the internal cavity and the discharge region; and (d) A corona preionizer mounted in said cavity and connected to an energy source for generating UV radiation, said UV radiation passing from the cavity through the opening in said one electrode and directly into the discharge region for preionizing the discharge.

* * * * *